US006845644B1

(12) United States Patent
Buckner

(10) Patent No.: US 6,845,644 B1
(45) Date of Patent: Jan. 25, 2005

(54) LOCKING ASSEMBLY

(76) Inventor: James D. Buckner, 350 Loblolly Way, Grasonville, MD (US) 21638

( * ) Notice: Subject to any disclaimer, the term of this patent is extended or adjusted under 35 U.S.C. 154(b) by 0 days.

(21) Appl. No.: 10/644,814

(22) Filed: Aug. 21, 2003

(51) Int. Cl.$^7$ .............................................. A44B 15/00
(52) U.S. Cl. ........................ 70/456 R; 70/457; 70/459; 24/3.6; 24/20 EE; 24/598.2
(58) Field of Search ............................. 70/456 R–459; 24/3.6, 72.5, 598.2, 20 EE, 716

(56) References Cited

U.S. PATENT DOCUMENTS

| | | | |
|---|---|---|---|
| 1,368,525 A | | 2/1921 | Parks |
| 1,432,294 A | | 10/1922 | Jungk |
| 1,452,492 A | | 4/1923 | Carpenter |
| 1,473,354 A | * | 11/1923 | Nachtrieb .................... 402/20 |
| 1,597,525 A | | 8/1926 | Knake |
| 1,784,667 A | | 12/1930 | Gillet |
| 2,358,606 A | | 9/1944 | Summers |
| 2,410,951 A | * | 11/1946 | Kuhnl ......................... 70/458 |
| 2,432,870 A | * | 12/1947 | Evalt ........................... 70/458 |
| 2,450,425 A | | 10/1948 | Frisby |
| 2,551,384 A | * | 5/1951 | Middleton et al. ........... 16/87.2 |
| 2,585,500 A | * | 2/1952 | Roy ............................ 16/87.2 |
| 2,860,540 A | | 11/1958 | Karlsson |
| 3,141,208 A | * | 7/1964 | Stradella ................... 24/20 EE |
| 3,214,204 A | | 10/1965 | Carter |
| 3,516,272 A | * | 6/1970 | Modrey ....................... 70/459 |
| 3,662,642 A | | 5/1972 | Bernard |
| 3,853,413 A | | 12/1974 | Parran |
| 3,881,334 A | * | 5/1975 | Wilson ........................ 70/457 |
| 4,176,534 A | * | 12/1979 | Denney ........................ 70/408 |
| 4,242,775 A | | 1/1981 | Eickmann |
| 4,274,323 A | | 6/1981 | Resnicow |
| 4,371,301 A | | 2/1983 | Lawson |
| 4,405,251 A | | 9/1983 | Kolchinsky et al. |
| 4,429,557 A | * | 2/1984 | Morrone, III ............. 70/456 R |
| 4,474,043 A | * | 10/1984 | Morrone, III ............. 70/456 R |
| 4,581,910 A | * | 4/1986 | Brooks et al. ............ 70/456 R |
| 4,792,253 A | * | 12/1988 | Jacobson ...................... 402/20 |
| 4,891,961 A | * | 1/1990 | Tsamas ..................... 70/456 R |
| 5,106,252 A | | 4/1992 | Shapton |
| 5,127,764 A | | 7/1992 | Baer |
| 5,172,500 A | | 12/1992 | Renski et al. |
| 5,465,596 A | * | 11/1995 | Park ............................. 70/458 |
| 5,768,752 A | * | 6/1998 | Oetiker ....................... 24/20 R |
| 5,797,168 A | * | 8/1998 | Nagano ...................... 24/20 R |
| 5,813,262 A | * | 9/1998 | Crumley et al. .............. 70/457 |
| 5,857,800 A | | 1/1999 | Nell |
| 6,098,251 A | * | 8/2000 | Zielinski ..................... 24/20 R |
| 6,185,793 B1 | * | 2/2001 | Kitamura et al. ........... 24/20 R |
| 6,186,880 B1 | | 2/2001 | Gonzalez et al. |
| 6,243,922 B1 | * | 6/2001 | Simon .......................... 24/3.6 |
| 6,243,929 B1 | * | 6/2001 | Curwood ................... 24/598.2 |
| 6,257,792 B1 | | 7/2001 | Read, Jr. |

* cited by examiner

Primary Examiner—Suzanne Dino Barrett
(74) Attorney, Agent, or Firm—Rosenberg, Klein & Lee

(57) ABSTRACT

A locking assembly (100) consists of a pair of closable devices (110, 120) secured together in a contiguous side-by-side relationship and being displaceable, each relative to the other. Each of the closable devices (110, 120) has opposing end portions (112, 114 and 122, 124, respectively) defining a closable gap therebetween. A corresponding clasp (130, 140) is formed on the opposing end portions of each closable device (110, 120). The clasp (130, 140) is operable to selectively retain the opposing end portions in an overlapping relationship or to release the opposing end portions to define the closable gap therebetween. The clasps (130, 140) of both closable devices are simultaneously inoperable when one of the pair of closable devices is disposed in a first position relative to the other one of the closable devices and are simultaneously operable when one of the pair of closable devices is disposed in a second position relative to the other of the closable devices.

23 Claims, 9 Drawing Sheets

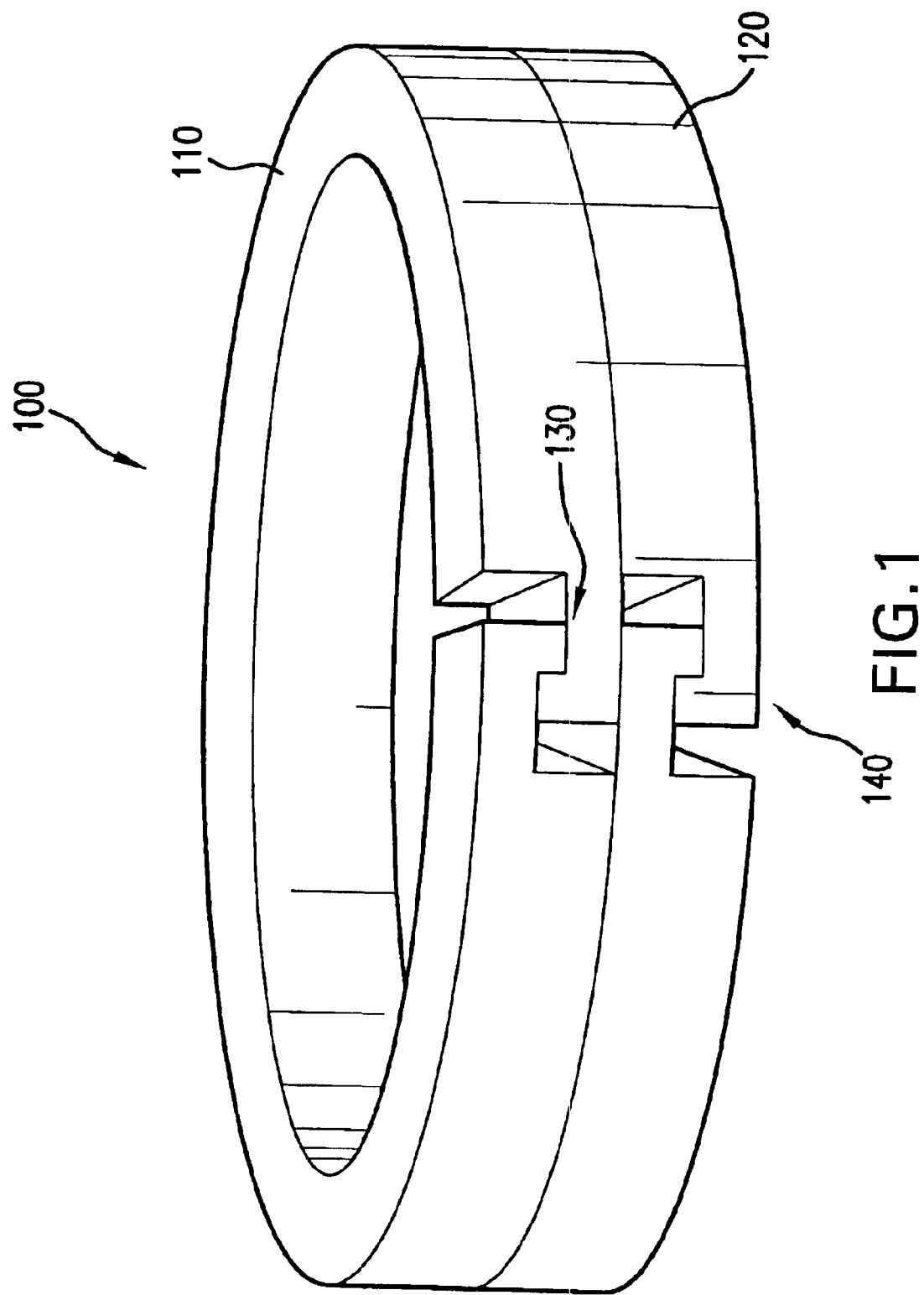

LOCKING ASSEMBLY

BACKGROUND OF THE INVENTION

1. Field of the Invention

The invention disclosed herein generally relates to locking mechanisms using independently closable devices such as closable ring fasteners or linearly displaceable latching mechanisms, that are joined together. More specifically, the invention relates to a pair of closable devices displaceably coupled together which may be opened or closed only when one device is displaced to a predetermined position with respect to the other device.

2. Description of the Prior Art

Numerous ring fasteners and arcuate clips currently exist which may be attached to a tube or shaft for connecting the tube or shaft to another component or for providing a mechanical stop at an end of the tube or shaft. Such devices include retaining clips, snap rings, and hose clamps, all of which are usually retained in position by an elastic force and/or by a mechanical closure.

Ring fasteners that are held in place by only an elastic force are generally easy to apply, but usually cannot be locked in place. Thus, the fasteners may be inadvertently dislodged, which can lead to a catastrophic failure of the mechanism to which they are coupled. Additionally, the fasteners may lose their coupling ability with repetitive application, as the elasticity of the resilient material used to construct the fastener diminishes each time it is expanded or compressed in the application process.

Mechanical closures of the prior art are many and varied and include screw-type tighteners found on some hose clamps, which are bulky and difficult to operate when the hose clamp is loose, and one-way zip-tighteners found on common cable ties, which require the destruction of the cable tie for its removal and often include a sharp end where excess tie material has been removed.

In light of the foregoing shortcomings of ring fasteners of the prior art, there is an apparent, unfulfilled need in the art for a locking ring which is easily applied, lockable in position and possessing a compact closing mechanism.

SUMMARY OF THE INVENTION

The present invention overcomes the previously described shortcomings of ring fasteners of the prior art by providing a locking ring assembly which may be opened or closed only when a first one of a pair of closable devices is rotated to a predetermined angular position relative to a second one of the pair of closable devices.

In one aspect of the present invention, a pair of closable devices are secured together in contiguous adjacency. The pair of closable devices are displaceable, each relative to the other, and each closable device has opposing end portions defining a closable gap therebetween. A clasp is disposed on the opposing end portions of each of the closable devices. The clasp of each closable device is operable to selectively retain the opposing end portions in an overlapping manner or to release the opposing end portions to define the closable gap. The clasps of both closable devices are simultaneously inoperable responsive to one of the pair of closable devices being disposed in a first position relative to that of the other closable device and the clasps of both closable devices are simultaneously operable responsive to one of the pair of closable devices being disposed in a second position relative to that of the other closable device.

In a further aspect of the invention, the closable devices are linearly extending members, each being longitudinally displaceable with respect to the other.

In another aspect of the invention, the closable devices are formed in substantially annular contour and are angularly displaceable, each relative to the other.

In still another aspect of the present invention, the closable devices form a locking ring assembly which is used as a key ring. The pair of closable rings are secured together in contiguous adjacency and in an angularly displaceable relationship. Each of the closable rings have opposing end portions adapted to be selectively disposed in overlapping relationship and displaceable, one from the other, to define a gap therebetween. The end portions of each of the closable rings include a respective pair of complementary interlocking respectively formed thereon. The overlapping end portions are simultaneously locked against displacement responsive to one of the closable rings being disposed in a first angular position relative to the other closable ring. The overlapping end portions are simultaneously free to be displaced responsive to one of the closable rings being disposed in a second angular position relative to the other closable ring.

BRIEF DESCRIPTION OF THE DRAWINGS

FIG. 1 is an illustration of an exemplary embodiment of the present invention;

DETAILED DESCRIPTION OF THE PREFERRED EMBODIMENTS

Figure 2A:
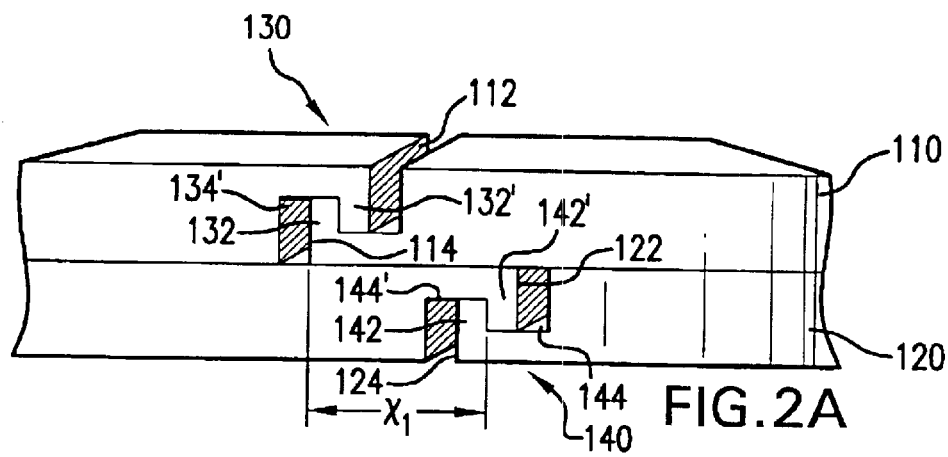
FIG. 2A–FIG. 2D illustrate the operation of the locking mechanism of the present invention.

An embodiment of the present invention is illustrated in FIG. 1. As is shown in the Figure, a locking assembly, generally indicated at 100, consists of a first substantially annular closable device 110 and a second substantially annular closable device 120. Each of the closable devices 110, 120 comprises a closable ring, in that the closable devices 110, 120 include a clasp generally indicated at 130 and 140, respectively, at a closable gap formed in the closable ring. Each of the clasps 130, 140 are constructed to be selectively retained in a closed position or released into an open position.

The first closable device 110 and the second closable device 120 are secured together adjacently in a contiguous side-by-side relationship as shown in FIG. 1. As will be discussed in paragraphs that follow, the two closable devices, or closable rings 110, 120, are retained in contiguous adjacency by means of a coupling mechanism. The two closable rings 110, 120 are held in adjacent parallel relationship so that both clasps 130, 140 are simultaneously inoperable, i.e., prevented from being released into an open position, when the clasps of each ring 110, 120 are angularly displaced from one another to a first angular position and both clasps 130, 140 of closable rings 110, 120 are simultaneously operable, i.e., free to be released into an open position, when the clasps 130, 140 thereof are angularly displaced to a second angular position. The locking feature of the instant invention is depicted in FIGS. 2A–2D.

Referring to FIG. 2A, there is shown clasp 130 of closable device 110 displaced to a position x, with respect to the clasp 140 of closable device 120. It is to be noted that displacement x, is a longitudinal displacement where closable devices 110, 120 are linear members, as shown in FIGS. 2A–2D and displacement $x_1$ is an angular displacement when closable devices 110, 120 are closable rings, as shown in FIG. 1. Clasp 130 includes a protuberance 132 formed on a first end 114 of closable device 110 and a complementary protuberance 132' formed on an opposing end 112 of closable device 110. Each protuberance 132, 132' extends transversely from respective longitudinal tabs 134, 134' to form a recess adjacent to protuberances 134, 134' in each opposing end of closable device 110 at clasp 130. Similarly, clasp 140 includes a protuberance 142 extending transversely from longitudinal tab 144 on a first end 124 of closable device 120 and a complementary protuberance 142' extending transversely from longitudinal tab 144 on an opposing end 122 of closable device 120. Each clasp 130, 140 is operated by engaging protuberances 132, 132' and 142, 142' into respective recesses formed in opposing ends 112, 114 and 122, 124, respectively.

In one working embodiment of the present invention, both closable devices 110, 120 are closable rings constructed from a resilient metallic material, such as spring steel, and the complementary protuberances 132, 132' and 142, 142' are biased against one another by the elasticity of the resilient material. One or both rings 10, 120 may be formed of other metallic materials, plastic compositions, or combinations thereof. In alternative embodiments, one of the closable rings 110, 120 may be of a resilient material while the other one of closable rings 110, 120 is constructed from a non-resilient material and the protuberances of both rings are biased against one another by the resilient closed ring.

In another embodiment of the present invention, closable devices 110, 120 are linear members and are held in longitudinal tension at opposing ends thereof, so as to bias the complementary protuberances 132, 132' and 142, 142' against one another.

With closable devices 110 and 120 positioned relative to one another to the respective positions shown in FIG. 2A, i.e., clasp 130 displaced from clasp 140 by an amount $x_1$, the clasps of both closable devices 110, 120 are not releasable and the locking assembly 100 cannot be opened. This is due to end 114 of closable device 110 extending over end 122 of closable device 120, while the closable devices 110, 120 are held in tight contiguous adjacency. As such, clasp 130 and clasp 140 may not be simultaneously opened, which requires outwardly displacing each set of opposing ends 112, 114 and 122, 124 sufficiently to permit the corresponding pair of protuberances 132, 132' and 142, 142', respectively, to transversely clear one another and be longitudinally separated. In the configuration of FIG. 2A, locking assembly 100 in a locked state.

Figure 2B:
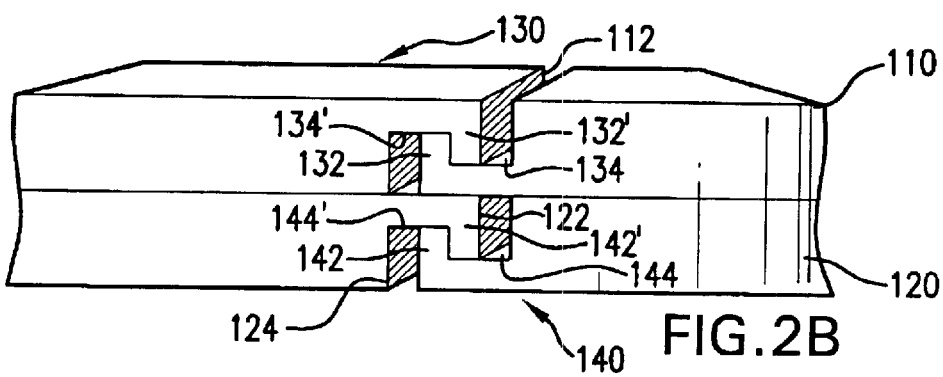

As is shown in FIG. 2B, when clasp 130 of closable device 110 is aligned with clasp 140 of closable device 120, i.e., the closable device 110 aligned with closable device 120, the end 114 of closable device 110 is still overlapping the end 122 of closable device 120. Thus, the locking assembly 100 remains in a locked state.

Figure 2C:
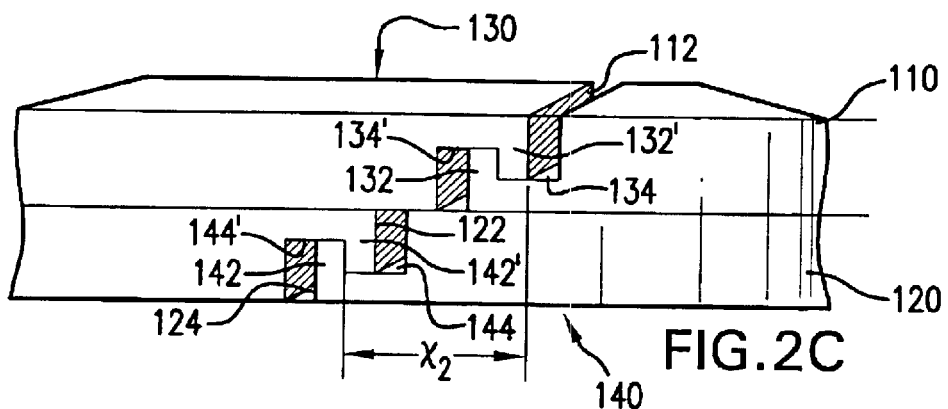
Figure 2D:
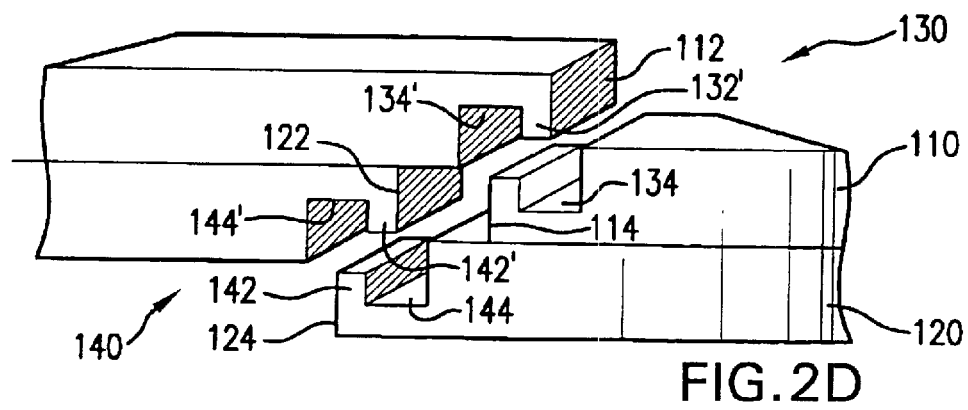

If closable rings 110 and 120 are displaced relative to one another in the direction from the position of FIG. 2A, through the aligned configuration of FIG. 2B, and then on to a second position having a displacement $x_2$, locking assembly 100 is then in the configuration shown in FIG. 2C. With the clasps in the illustrated alignment, end 114 of closable device 110 is no longer overlapping end 122 of closable device 120 and both clasps 130, 140 are simultaneously operable to open the devices 110 and 120. Thus, end 112 of closable device 110 and end 122 of closable device 120 are free to be outwardly displaced at clasps 130, 140 from end 114 of closable device 110 and end 124 of closable device 120, respectively. As is illustrated in FIG. 2D, the locking assembly 100 is capable to be opened, whereby a closable gap is formed therein.

As is shown in FIG. 2A–FIG. 2D, locking assembly 100 is prevented from being opened unless clasp 130 is displaced relative to clasp 140 by at least a predetermined amount. The minimum predetermined relative displacement distance at which the locking assembly 100 is operable to open is where clasps 130 and 140 are positioned so that end 114 of closable device 110 is no longer overlapping end 122 of closable device 120.

Whereas the illustrations of FIG. 2A-2D are descriptive of how the locking assembly 100 is maintained in a locked state and is thereby prevented from being opened, the same mechanism operates to prevent the locking assembly 100 from being closed, i.e., devices 110 and 120 must be in a predetermined alignment. For the embodiments of FIGS. 2A–2D, this alignment is the same as that for permitting the locking assembly 100 to be opened. More clearly stated, unless devices 110 and 120 are displaced with respect to one another so that end 114 of closable device 110 does not overlap end 122 of closable device 120, locking assembly 100 is prevented from both being opened from a closed state and being closed from an open state.

Figure 3A:
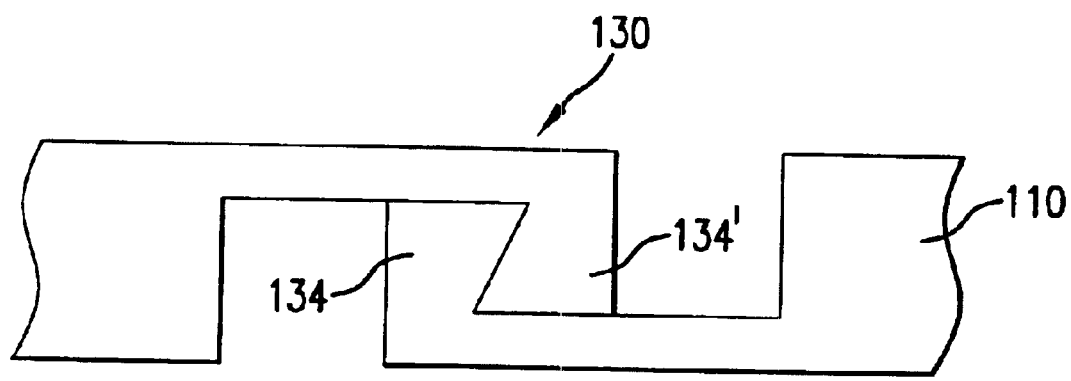
FIG. 3A and FIG. 3B are illustrations of alternative embodiments of the clasp mechanism of the present invention.

The protuberances on opposing ends of each of the closable rings 110 and 120 are not restricted to any particular shape. Referring to FIG. 3A, there is shown clasp 130 of closable device 10 including complementary protuberances 134, 134' of a substantially trapezoidal cross-sectional profile. The exemplary configuration of FIG. 3A prevents an accidental or premature opening of locking assembly 100 when the assembly is in the previously-described unlocked state. In some applications, it may be desired to maintain the clasp in the closed position while the locking assembly 100 is subject to opposing transverse forces on respective opposing ends of closable devices 110, 120 while the locking assembly 100 is in its unlocked state.

Figure 3B:
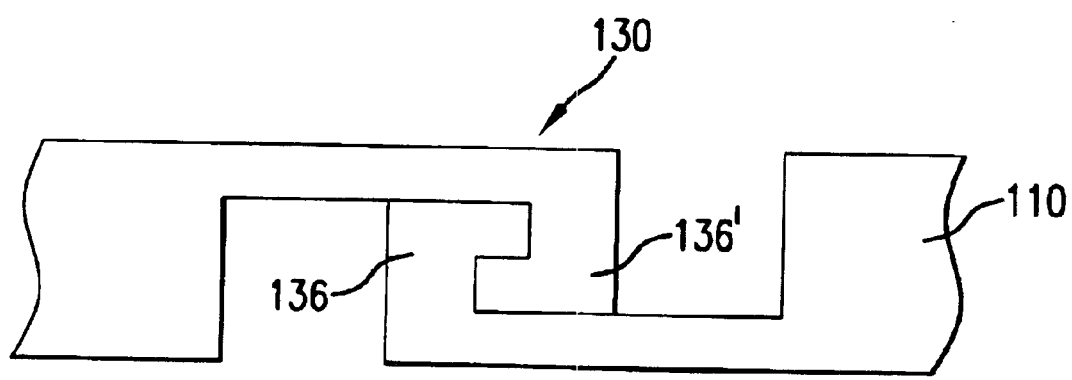

An alternative clasp configuration is illustrated in FIG. 3B. In the illustrated embodiment, complementary protuberances 136, 136' are of a substantially L-shaped cross-sectional profile. In like manner to the clasp configuration of FIG. 3A, the L-shaped protuberances of FIG. 3B prevent an unwanted opening of locking assembly 100 while it is in its unlocked state.

While only a few possible embodiments of clasp 130, 140 have been shown, it should be clear to the ordinarily skilled artisan that many clasp configurations are applicable to the subject locking assembly. In fact, any clasp configuration where opposing transverse forces must be applied to opposing ends of closable devices 110 and 120 to separate the members of the clasp falls within the intended scope of the instant invention.

Figure 4A:
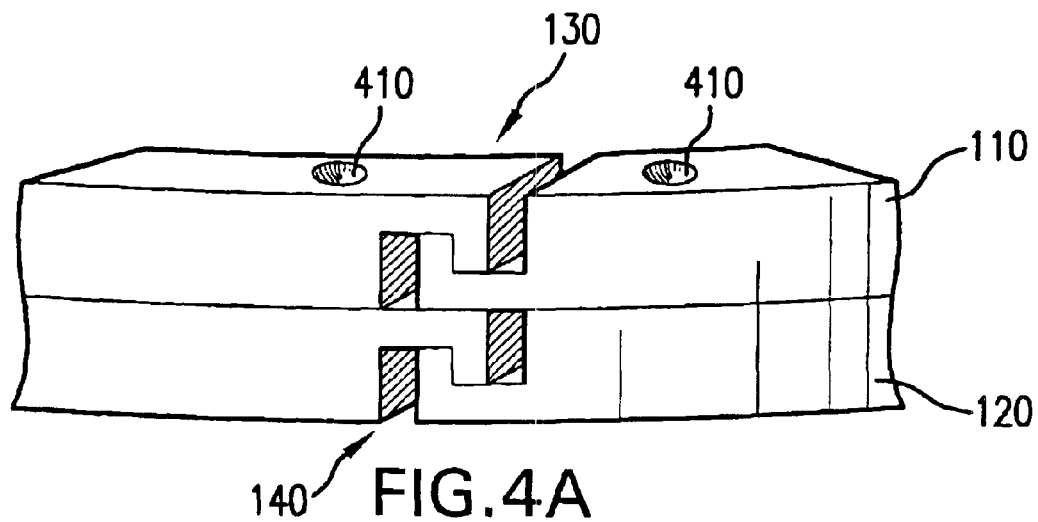
FIG. 4A and FIG. 4B illustrate embodiments of the locking ring operation tool connection means of the present invention.
Figure 4B:
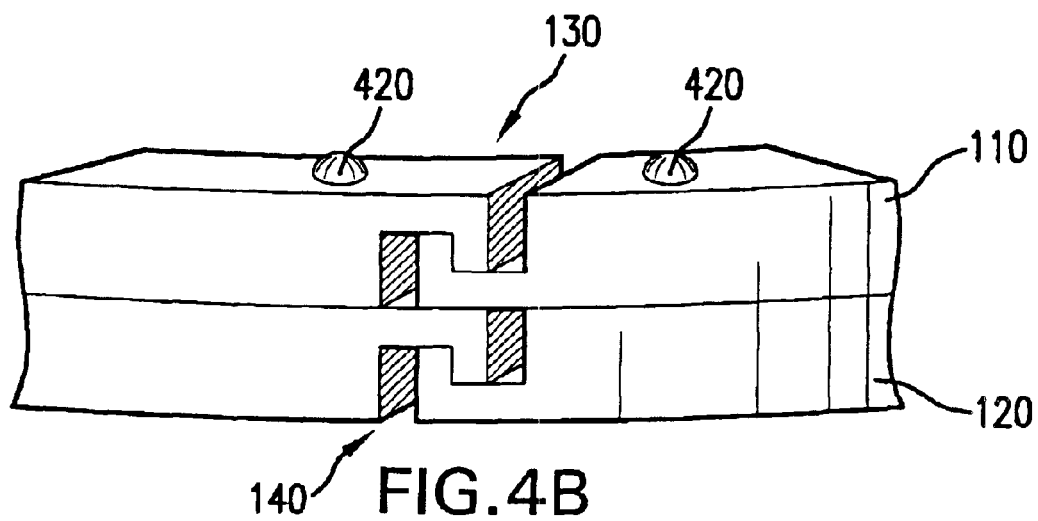

In some applications of the present invention, particularly when closable devices 110, 120 are formed into closable rings 110, 120 and united to form locking ring assembly 100, it may be necessary to operate the locking ring assembly 100 by the use of a locking ring operating tool. The locking ring operating tool (not shown) may be used to operate the clasps 130, 140 and/or may be used to rotate closable ring 110 with respect to closable ring 120. To that end, one or both of closable rings 110, 120 may have disposed on a surface thereof connecting adaptations for attaching the locking ring operating tool to the respective ring. In one embodiment, the connecting adaptation includes a pair of depressions or holes 410 formed on a respective side of the clasps 130, 140, as shown in FIG. 4A. Alternatively, the connecting adaptation may include a protuberance 420 disposed on both sides of the clasps 130, 140, as is illustrated in FIG. 4B, or a combination of protuberances and depressions (not shown).

Figure 5:
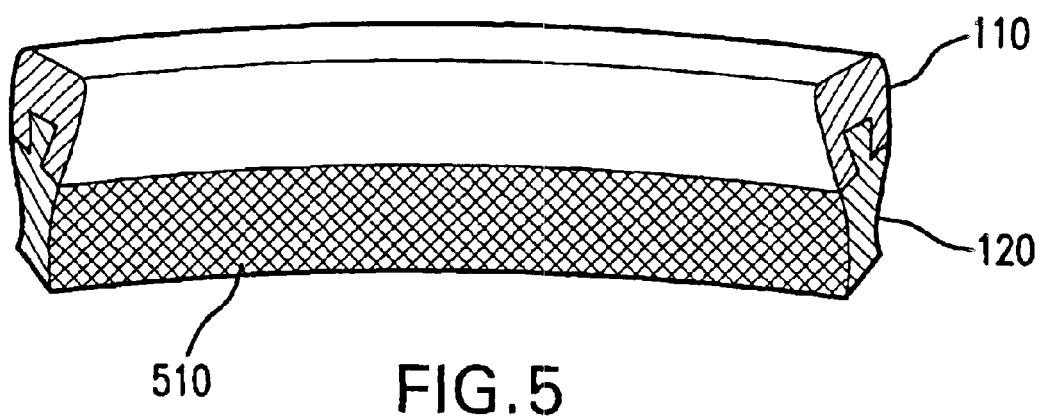
FIG. 5 is an illustration of an embodiment of the present invention in which grooves or ribs are formed on at least one of the closable devices of the present invention.

In other applications of the instant invention, it may be desired to maintain one of the closable rings 110, 120 stationary while allowing the other one of the closable rings 110, 120 to rotate with respect to the stationary ring. This may be accomplished by roughening one or more exposed surfaces of the stationary ring through the formation of a plurality of grooves or raised ribs 510, as illustrated in FIG. 5. In the exemplary arrangement shown in the Figure, closable ring 120 has formed on an inner surface thereof a plurality of crossed hatch grooves, e.g., by a knurling operation, to increase the friction between closable ring 120 and the surface with which it is in contact. Thus, closable ring 110, which is free of any grooves or raised ribs, is allowed to rotate whereas closable ring 120 is held against rotation due to the increased friction of grooves or ribs 510.

Figure 6A:
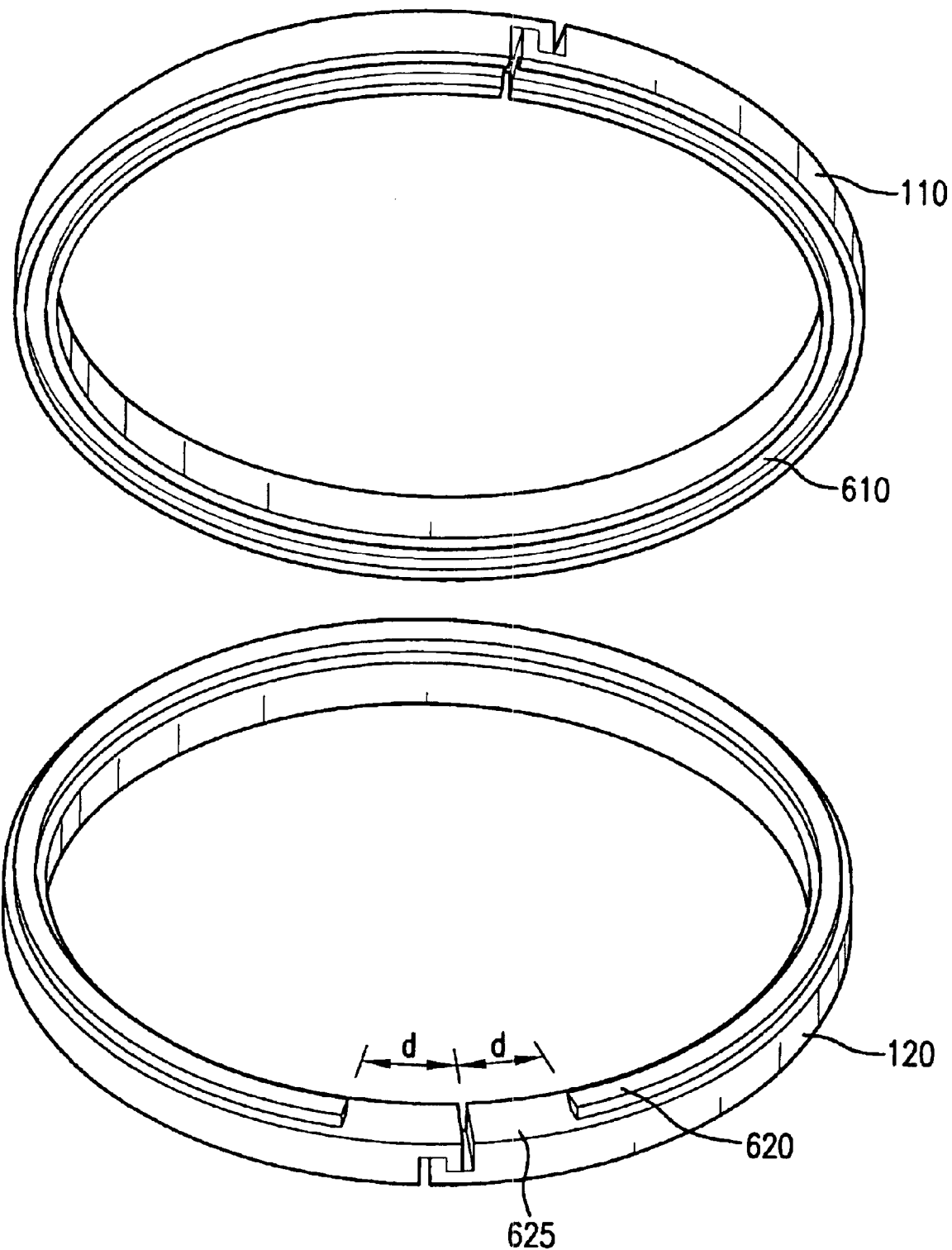
FIG. 6A and FIG. 6B illustrate embodiments of the coupling means for securing together the pair of closable devices of the present invention.

As briefly discussed hereinabove, closable device 110 is held adjacently in a side-by-side configuration by a coupling mechanism. Any method for maintaining the closable devices 110, 120 in tight adjacency in side-by-side orientation, while being respectively displaceable, are within the scope of the instant invention. An exemplary connecting mechanism is illustrated in FIG. 6A. As is shown in the Figure, closable ring 110 has formed in a lower surface thereof groove 610 which is of a first cross-sectional profile. Additionally, closable ring 120 has a protrusion extending upward from an upper surface thereof to define a continuous ridge 620. The continuous ridge 620 is of a complementary cross-sectional profile to groove 610 in closable ring 110. The first and second closable rings 110, 120 are assembled into locking ring assembly 100 by inserting ridge 620 into groove 610, thereby maintaining of closable rings 110 and 120 in the preferred contiguous side-by-side arrangement, while at the same time allowing rings 110 and 120 to be rotatable, each with respect to the other. Obviously, which of the two rings is formed with the groove 610 on the ridge 620 is immaterial to the scope of the inventive concept disclosed herein.

The continuous ridge 620 disposed on closable ring 120 is terminated a predetermined distance d from each side of clasp 140. The absence of ridge 620 in the region of clasp 140 prevents an undesirable locking state of locking ring assembly 100 by having ridge 620 engaged in groove 610 even when the rings 110, 120 are angularly displaced in the unlocked configuration, e.g., the alignment configuration of FIGS. 2C and 2D. Were it not for ridge 620 being terminated in the above-described manner, ridge 620 engaging in groove 610 would hold clasps 130, 140 in the closed position even if the clasps 130, 140 were in the unlocked configuration.

Figure 6B:
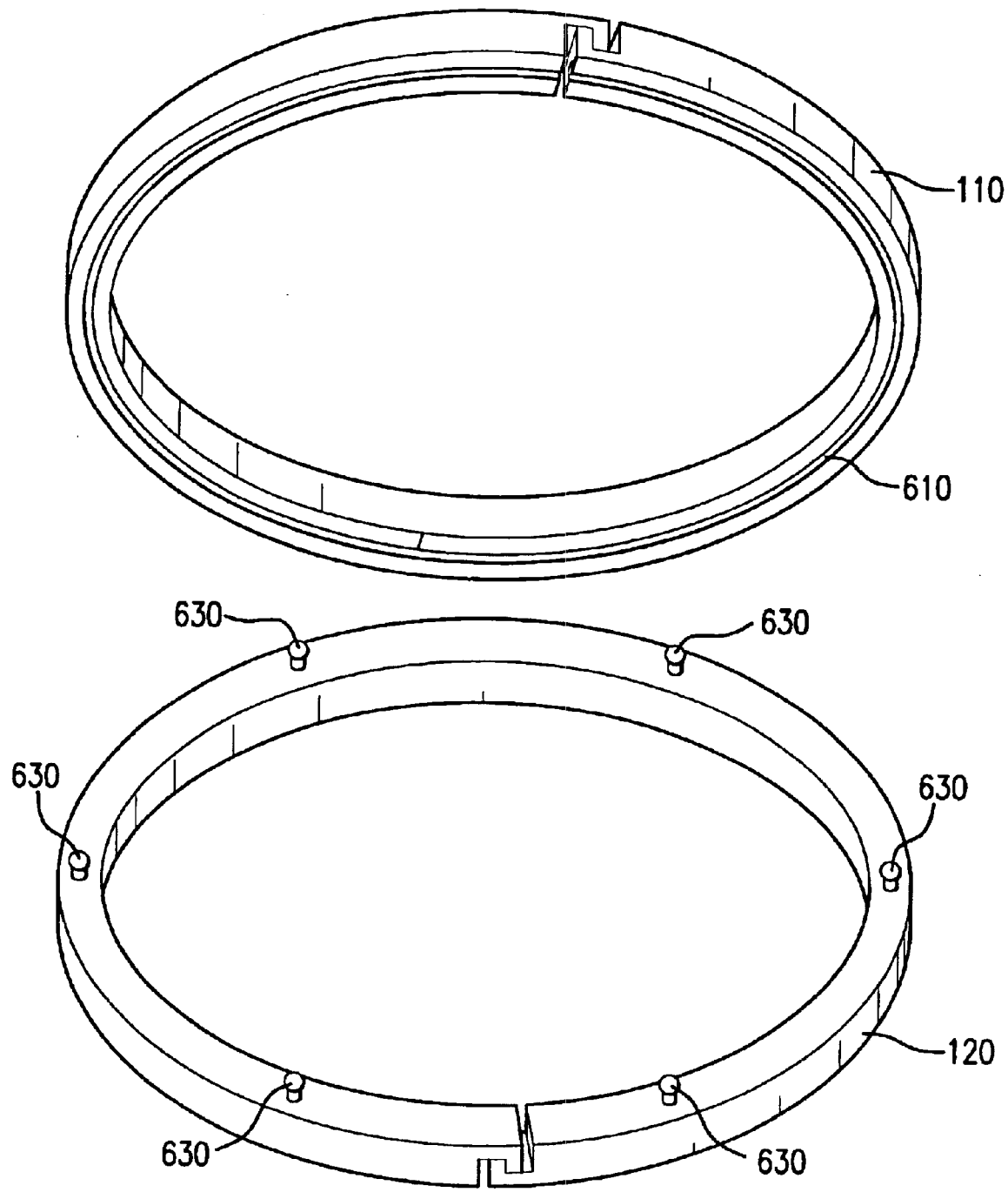

Referring to FIG. 6B, there is shown an alternative coupling configuration wherein the protrusion extending from the upper surface of ring 120 is defined by a plurality of bosses 630 extending upward from the upper surface of closable ring 120. Each of the plurality of bosses 630 have a cross-sectional profile complementary to that of continuous groove 610 in closable ring 110. Thus, as with the embodiment illustrated in FIG. 6A, the embodiment of FIG. 6B secures rings 110 and 120 in contiguous side-by-side relationship while allowing the closable rings 110, 120 to be angularly displaced, each with respect to the other.

Figure 7A:
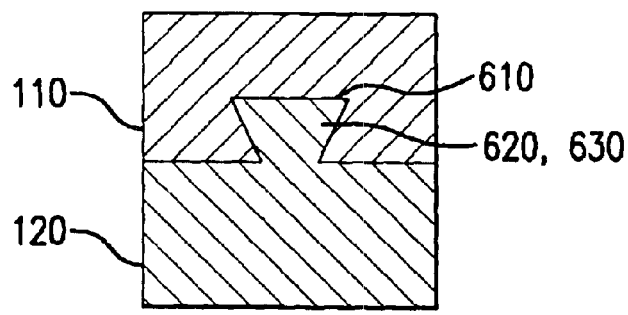
FIG. 7A–FIG. 7E are cross-sectional views of embodiments of the coupling means of the present invention.
Figure 7B:
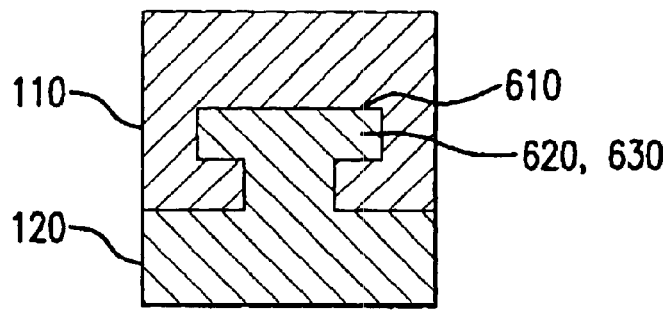
Figure 7C:
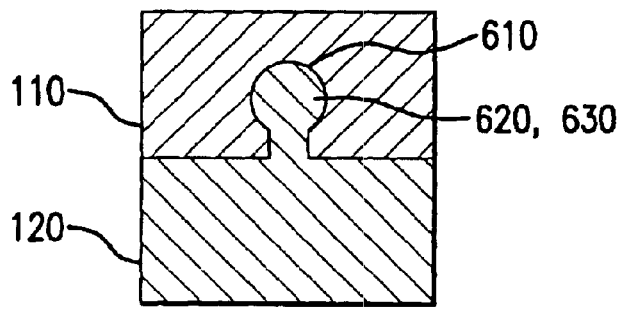
Figure 7D:
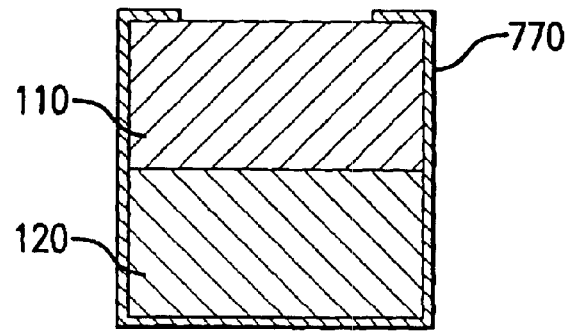

As previously indicated, the coupling mechanism for securing closable devices 110 and 120 in contiguous side-by-side relationship may be embodied in many different ways. As is shown in FIG. 7A, the coupling mechanism may include a ridge or boss 620, 630 of substantially tetrahedral cross-section on closable device 120 engaged in groove 610 of complementary tetrahedral cross-sectional profile formed in closable device 110. Alternatively, as is shown in FIG. 7B, the coupling mechanism may include a T-shaped ridge or boss 620, 630 on closable device 120 engaged in a complementary T-shaped groove 610 formed in closable device 110. In another embodiment, as is shown in FIG. 7C, ridge or boss 620, 630 on closable device 120 is substantially arcuate or circular in cross-sectional contour and is engaged in the complementary groove 610 formed in closable device 110. In yet another embodiment, locking rings 110 and 120 are held in contiguous side-by-side relationship by means of at least one band 770 substantially encompassing the outer surfaces of both closable devices 110, 120, as illustrated in FIG. 7D.

Figure 7E:
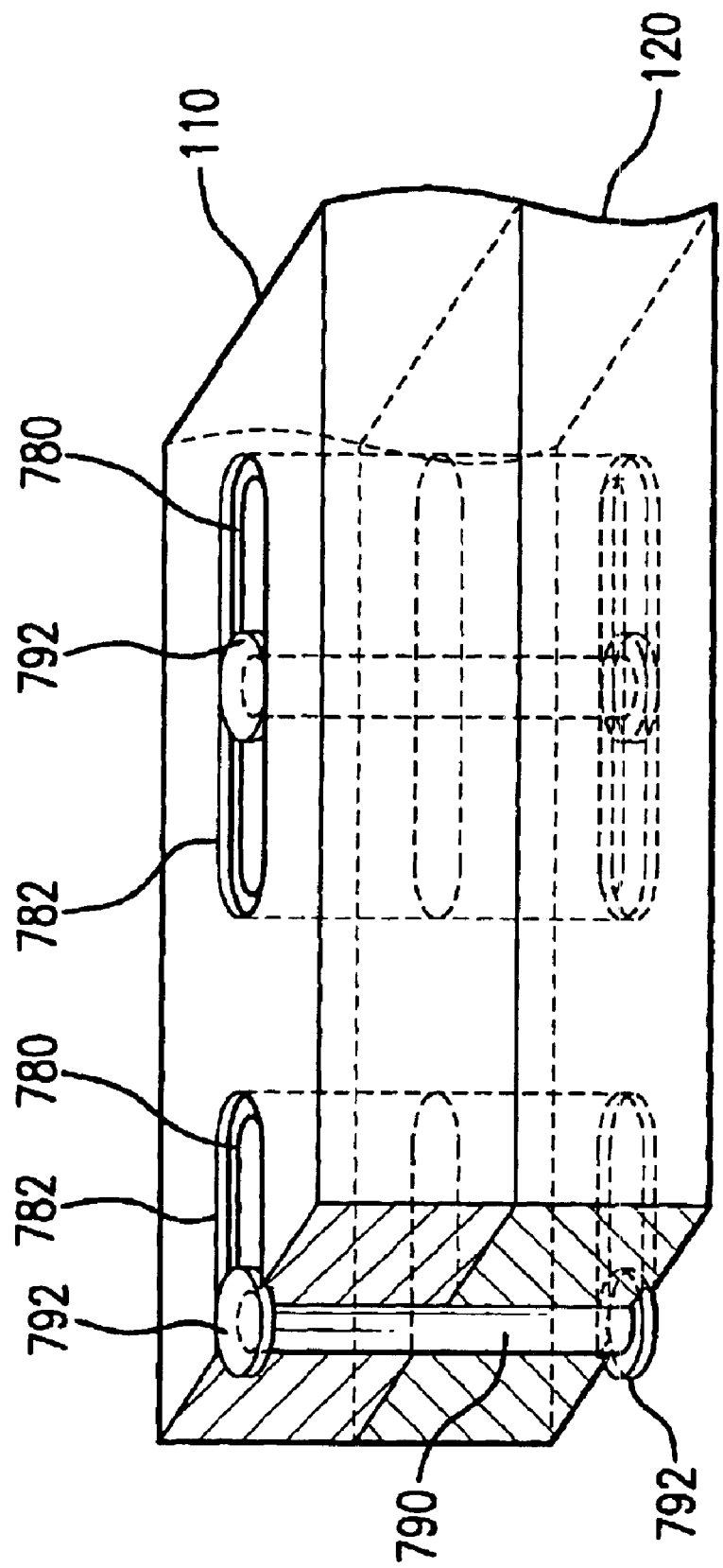

The coupling mechanism for retaining closable devices 110 and 120 in contiguous adjacency may include the use of fastening devices, as is illustrated in FIG. 7E. As is shown in the Figure, closable devices 110, 120 have formed therein at least one elongated slot 782 through which is passed a corresponding elongated fastener 790. Fastener 790 has disposed on each end thereof an enlarged end portion 792. Fastener 790 may be a rivet, a bolt and nut, or any fastening device capable of being extended through slots 782 of both closable devices 110 and 120 and having disposed at each end thereof an enlarged end portion 792. Alternately, only one closable device need have elongated slots through which the fasteners extend for coupling to the other closable device. The enlarged end portion 792 of each fastening device 790 is held at or below the outer surfaces of closable devices 110, 120 by means of recess 780 circumscribing each slot 782. In one embodiment, the enlarged end portions 792 of fastening device 790 secure the closable devices 110 and 120 in the contiguous side-by-side relationship and the smaller diameter section of fastener 790 disposed in each elongated slot 782 permit and constrain the relative displacement between the two closable devices 110, 120.

Figure 8:
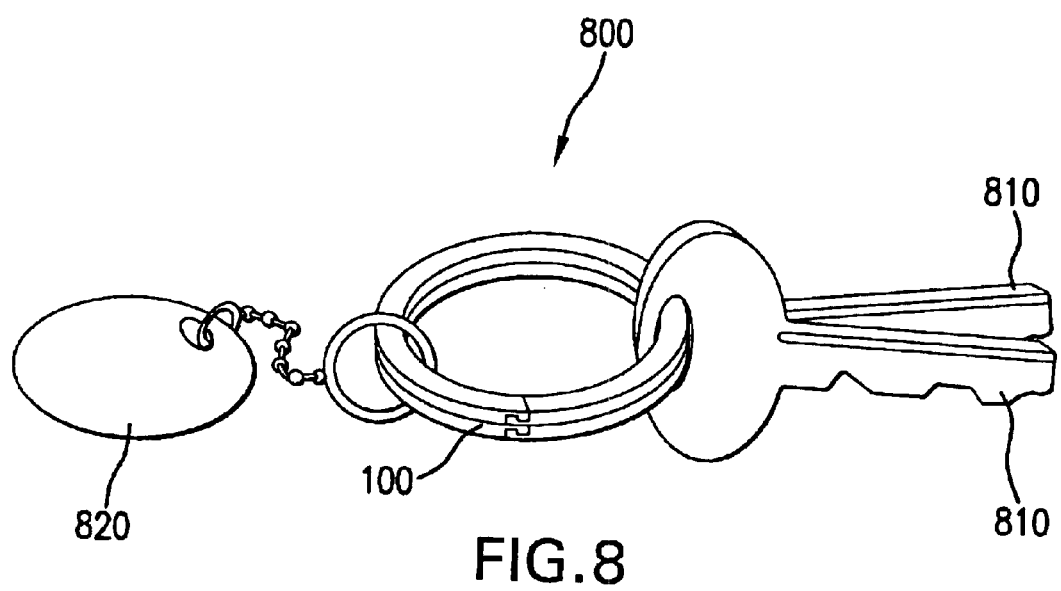
FIG. 8 is an illustration of a key ring using the locking ring assembly of the present invention.

Whereas the locking ring assembly 100 of the instant invention has many practical mechanical applications as a fastening device, a gasket, a closure device, etc., the locking ring assembly 100 may also be applied as a mechanical, yet decorative, element of many other broad applications. Such an embodiment is considered in FIG. 8, where there is shown a key ring 800 including the locking ring assembly 100 as previously described herein. To add appeal to the key ring, locking ring assembly 100 may be plated or may be constructed from a precious metal. The locking ring 100 may be opened in the manner previously described herein to add and remove elements such as keys 810 and key fob 820. Then, in the manner previously described herein, the locking ring assembly 100 may be placed in a locked state to prevent the locking ring 100 from opening, thereby retaining keys 810 and key fob 820 on the key ring assembly 800.

Although the present invention has been described herein in conjunction with specific embodiments thereof, many alternatives, modifications, and variations will be apparent to those skilled in the art. The present invention is intended to embrace all such alternatives, modifications, and variations that fall within the spirit and broad scope of the appended claims.

What is claimed is:

1. A locking assembly comprising:
a pair of closeable devices secured together in contiguous overlaying relationship and being slidably displaceable, each relative to the other, each of said closeable devices having opposing end portions defining a closeable gap therebetween; and
a clasp disposed on said opposing end portions, said clasp being operable to selectively retain said opposing end portions in an overlapping relationship or release said opposing end portions to define said closeable gap, said clasp of both closeable devices being simultaneously inoperable responsive to one of said pair of closeable devices being disposed in a first position relative to the other of said closeable devices, said clasp of both closeable devices being simultaneously operable responsive to said one of said pair of closeable devices being disposed in a second position relative to said other of said closeable devices.

2. The locking assembly as recited in claim 1, wherein said pair of closeable devices are secured in said contiguous overlaying relationship by at least one band disposed around said pair of closeable devices.

3. The locking assembly as recited in claim 1, wherein said pair of closeable devices are secured in said contiguous overlaying relationship by at least one groove having a first cross-sectional profile formed in at least one surface of one of said pair of closeable devices and at least one protrusion having a second cross-sectional profile extending from at least one surface of the other of said closeable devices, said first cross-sectional profile being complementary to said second cross-sectional profile, said at least one protrusion being engaged in a corresponding one of said at least one groove.

4. The locking assembly as recited in claim 3, wherein said at least one protrusion is a ridge continuously disposed on at least one surface of said other of said closeable devices, said ridge being terminated at a predetermined distance from each side of said clasp.

5. The locking assembly as recited in claim 3, wherein said at least one protrusion is a plurality of bosses each having said second cross-sectional profile.

6. The locking assembly as recited in claim 1, wherein said pair of closeable devices are secured in said contiguous overlaying relationship by at least one elongated fastener extending through an elongated slot formed in at least one of said pair of closeable devices.

7. The locking assembly as recited in claim 1, wherein said clasp includes interlocking protuberances respectively disposed on each of said opposing end sections of said pair of closeable devices.

8. The locking assembly as recited in claim 7, wherein said interlocking protuberances are of a substantially trapezoidal cross-sectional profile.

9. The locking assembly as recited in claim 7, wherein said interlocking protuberances are of a substantially L-shaped cross-sectional profile.

10. The locking assembly as recited in claim 1, wherein each of said pair of closeable devices are formed in a substantially annular contour and is angularly slidably displaceable relative to the other of said pair of closable devices.

11. The locking assembly as recited in claim 10, wherein at least one of said pair of closeable devices is constructed from a resilient material, said clasp being retained in said overlapping relationship by interlocking protuberances being biased one against the other, said interlocking protuberances respectively disposed on each of said opposing end sections of said pair of closable devices.

12. The locking assembly as recited in claim 10, wherein at least one of said pair of closeable devices includes a connection adaptation on a surface of each of said opposing end sections thereof for connecting a locking ring operating tool thereto.

13. The locking assembly as recited in claim 12, wherein said connecting adaptation is one of the group consisting of a depression, a hole, and a protuberance.

14. The locking assembly as recited in claim 10, wherein at least one of said pair of closeable devices includes at least one roughened exposed surface.

15. The locking assembly as recited in claim 1, wherein each of said pair of closable devices is a linearly extending member and is longitudinally slidably displaceable relative to the other of said pair of closable devices.

16. The locking assembly as recited in claim 15, wherein said clasp is retained in said overlapping relationship by interlocking protuberances biased one against the other, said interlocking protuberances being respectively disposed on each of said opposing end sections of said pair of closable devices.

17. A key ring comprising a pair of closeable rings secured together in contiguous overlaying relationship and being angularly slidably displaceable one with respect to the other, each of said closeable rings having opposing end portions adapted to be selectively disposed in overlapping relationship and displaceable one from the other to define a gap therebetween, said end portions of each of said closeable rings including a respective pair of complementary interlocking members respectively formed thereon, said overlapping end portions being simultaneously locked against displacement responsive to one of said closeable rings being disposed in a first angular position relative to the other of said closeable rings, said overlapping end portions being simultaneously free to be displaced responsive to said one of said closeable rings being disposed in a second annular position relative to said other closeable ring.

18. The key ring as recited in claim 17, wherein said pair of closeable rings are secured in said contiguous overlaying relationship by at least one band disposed around both of said closeable rings.

19. The key ring as recited in claim 17, wherein said pair of closeable rings are secured in said contiguous overlaying relationship by means of at least one groove having a first cross-sectional profile being formed on a surface of one of said pair of closeable rings and at least one protrusion having a second cross-sectional profile extending from at least one surface of the other of said closeable rings, said first cross-sectional profile being complementary to said second cross-sectional profile, said at least one protrusion being engaged in a corresponding one of said at least one groove.

20. The key ring as recited in claim 19, wherein said at least one protrusion is a ridge continuously disposed on at least one surface of said other of said closeable rings.

21. The key ring as recited in claim 20, wherein said ridge is terminated at a predetermined distance from each said opposing end portions of said other of said closeable rings.

22. The key ring as recited in claim 19, wherein said at least one protrusion is a plurality of bosses each having said second cross-sectional profile.

23. The key ring as recited in claim 17, wherein said pair of closeable rings are secured in said contiguous overlaying relationship by a plurality of elongated fasteners of a first diameter, each of said plurality of elongated fasteners having enlarged portions of a second diameter at each end thereof, said second diameter being greater than said first diameter, each of said elongated fasteners extending transversely through a corresponding one of a plurality of elongated slots formed in one of said pair of closeable rings and through a corresponding one of a plurality of elongated slots formed in the other of said pair of closable rings, each of said plurality of elongated slots having longitudinal walls transversely separated by a distance greater than said first diameter and less than said second diameter.

* * * * *